United States Patent

Chen et al.

Patent Number: 5,812,780
Date of Patent: Sep. 22, 1998

[54] METHOD, SYSTEM, AND PRODUCT FOR ASSESSING A SERVER APPLICATION PERFORMANCE

[75] Inventors: John Yun-Kuang Chen, Seattle; Eric Neil Lockard, Redmond; Matthew David Durasoff, Kirkland; Darren Arthur Shakib, Redmond; Russell Lee Simpson, Jr., Seattle, all of Wash.

[73] Assignee: Microsoft Corporation, Redmond, Wash.

[21] Appl. No.: 653,412

[22] Filed: May 24, 1996

[51] Int. Cl.$^6$ .............................. G06F 13/38; G06F 15/17
[52] U.S. Cl. ...................... 395/200.54; 702/122; 395/500
[58] Field of Search ............................. 395/200.54, 674, 395/675, 241, 200.38, 200.57, 200.33, 200.53, 500; 370/252, 253; 702/122, 188

[56] References Cited

U.S. PATENT DOCUMENTS

| | | | |
|---|---|---|---|
| 4,797,878 | 1/1989 | Armstrong | 370/450 |
| 5,303,166 | 4/1994 | Amalfitano et al. | 395/185.07 |
| 5,524,106 | 6/1996 | Tremel et al. | |
| 5,598,536 | 1/1997 | Slaughter, III et al. | 395/200.49 |
| 5,606,705 | 2/1997 | Randall et al. | 395/200.33 |
| 5,631,827 | 5/1997 | Nicholls et al. | 705/28 |

*Primary Examiner*—Mark H. Rinehart
*Attorney, Agent, or Firm*—Workman Nydegger Seeley

[57] ABSTRACT

Method and system for assessing the performance of a server application that acquires performance information from the perspective of a simulated user and has significantly reduced hardware requirements. Particularly, actual user behavior is modeled so that accurate determinations can be made as to the number of users a given server application can adequately support.

User behavior is modeled in a client profile that contains user parameters corresponding to the nature, timing, and frequency of user activities in operating a client that in turn corresponds to client tasks. A plurality of processes and process threads are initiated to contact a server as a plurality of simulated clients from a single client computer, each simulated client making a separate logical connection to the server. A task scheduler will schedule the simulated client tasks that are determined for each simulated user by reference to the user parameters in the client profile throughout a work day. The scheduler also introduces a random element so that the tasks simulate natural variability in user behavior.

User receivable response times for the task corresponding to simulated user activity are maintained in a log file and the 95th percentile time or score for each task type is calculated. The individual task type scores may be weighted and averaged together to arrive at a weighted average response time. The weighted average response time can then be used as a threshold value to determine the total number of users a server application can adequately support.

39 Claims, 5 Drawing Sheets

METHOD, SYSTEM, AND PRODUCT FOR ASSESSING A SERVER APPLICATION PERFORMANCE

BACKGROUND OF THE INVENTION

1. The Field of the Invention

This invention relates to computer simulation systems and software testing models. This invention further treats the subject of simulating realistic loads on server application software for software systems utilizing the client-server model. Specifically, the invention relates to systems, methods, and computer program products for providing realistic load conditions on a server application by simulating the behavior of multiple users operating client software.

2. Present State of the Art

Over the last two decades, client-server computing has become an important and popular computing concept. The client-server model contemplates two separate programs that communicate one with another to achieve a desired function. The server portion or program is capable of servicing or communicating with multiple client portions or programs that are concurrently operated by users.

An example of a common client-server application is a database server. A common database is managed by a database server on a server computer. Clients (software running on client computers) are logically connected to the database server over a communications network and are operated or controlled by users. The users, through the clients, make various requests to the database server in order to view, insert, delete, or manipulate information in the common database managed by the database server. Typically, the server program and each of the multiple client programs are running on separate processors and communication is accomplished over a physical network, such as an Ethernet™ network or the Internet, though many other communication networks exist.

The advent of local area networking (LAN) greatly increased the use of the client-server model for software applications. Furthermore, the personal computer explosion of the 1980's and 1990's also lends itself to client-server computing since each individual at an organization can have a personal computer in their office or work space that is suitable to running client software that can communicate with high performance server computers running various server programs.

The dynamic growth of today's organizations and computer networks provides interesting challenges for network administrator and other information service (IS) professionals. Though server applications are designed to handle the work load of multiple clients, there are limits to how many clients a server can comfortably handle. There are even some circumstances when a server may physically be unable to manage all client requests when overloaded, but typically the major problem observed by a user of a client is the delay associated with handling common user activities as each individual request becomes backlogged.

The delay associated with server processing of client requests only becomes a serious problem when it becomes apparent to users of client software programs and is of such length to cause frustration. This varies depending on the context, application, and user expectations. For example, a 1000 millisecond delay would be considered wonderful for a response from a database query in a database of over one million records using current technology. As technology improves and users become conditioned to expect quicker response times, a 1000 millisecond delay may be perceived as unacceptably slow in the future. Furthermore, other applications may have an entirely different "tolerance threshold," either longer or shorter than 1000 milliseconds, for response time delay. Therefore, the tolerance threshold varies depending on application, advances in technology, user conditioning, as well as other factors.

Usually, any delay less than the tolerance threshold is not a significant problem for the average user in many applications using current technology and under current conditions. However, as network traffic, client growth, and other factors slow down response times for common user activities beyond the tolerance threshold, a network administrator may begin to hear complaints from users. Complaints regarding response times for a given application program are a good indication that a server for that application is overworked and that a new server should be added in order to reduce response time. In many, if not most cases, server performance ultimately is a function of human user perception.

Because network administrators are responsible for network management, a paramount question in the mind of a network administrator regarding server applications on server computers becomes: "How many clients can this server support?" To answer this question, three general approaches can be taken. First, it is possible simply to continually increase the number of client computers attached to the network and view the effects of an actual load on response times. A second approach is to send artificial streams of requests to the server in order to directly assess server capability. Finally, one may create a mathematical model of the network and the software and use computer simulation techniques to project the interaction of the constituent pieces as users operating client software are added to the model.

Figure 1:
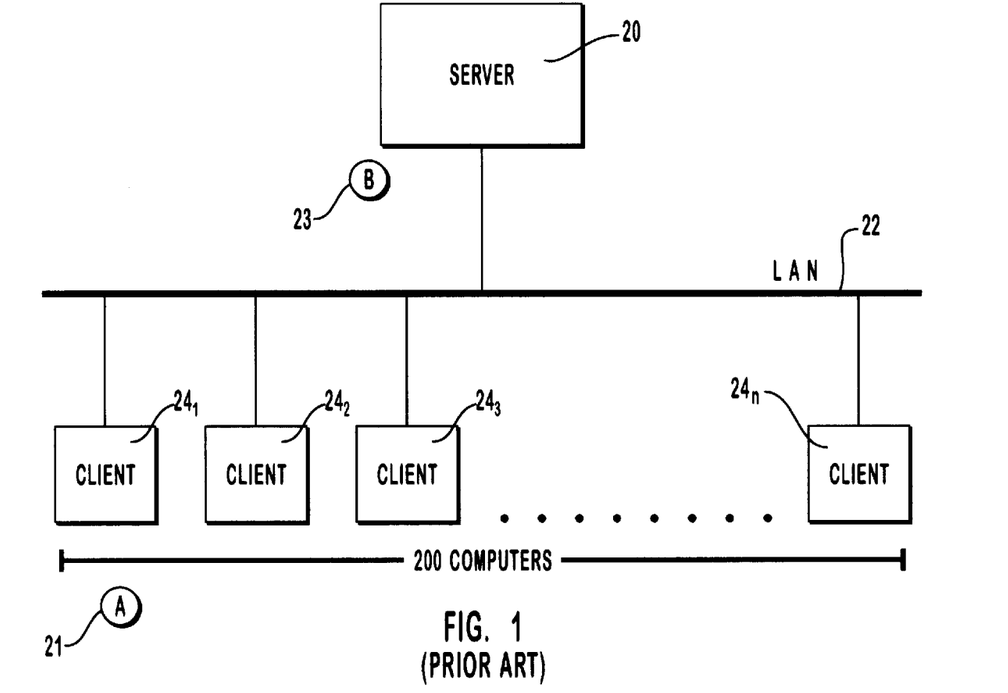
FIG. 1 shows a common client server arrangement over a local area network with each client running on a separate computer and each client having a user operate the client. This may represent a way of gathering user response time information for a given configuration or it may be a proposed configurations that the present invention will simulate.

The best way to test server response under a load is to create that exact load. This can be accomplished by setting the network topology in the desired configuration and have users seated at the respective computers to operate the client software and measuring the response times. While the best results can be attained by actually adding progressively more clients with users to operate the clients, this is usually prohibitively expensive. FIG. 1 shows a configuration that would require over two hundred computers. To measure actual response time in this configuration would be prohibitively expensive in terms of manpower and equipment. Even with automation scripts loaded on each client computer that replicates a user's interaction with the user interface in order to reduce the manpower requirement, there would still be a need for the many separate computers to run the individual clients. Furthermore, such an approach limits the ability of a network administrator to project and plan for the future or try certain "what if" scenarios.

The response times from the configuration shown in FIG. 1 are measured from the client perspective as operated by the user as symbolized by A located at 21. Client response times for the various tasks corresponding to user activities can be averaged to get a measure of server performance. Having such high quality data is desirable but is usually an expensive venture since FIG. 1 requires constructing the actual configuration that a network administrator would like to simply simulate in order to avoid all the expense and time of actual construction. The purpose behind such simulation before construction of the actual configuration is to assure the viability of the proposal before embarking on a major project.

It is also known to test server capability by issuing sequences of commands over a network directed toward the server. This form of testing gives good results as to a server's capability in terms of processing commands and even some insight into response times that can be expected should those strings of commands be met by the server. However, it is very difficult to simulate actual user behavior by mechanically issuing commands. In effect, response times are being measured at the server, symbolized by B located at 23, rather than at the user, symbolized by A located at 21. Furthermore, misleading results are common because humanly impossible command sequences are often introduced during the testing process. Since testing programs written in this fashion communicate directly with the server, rather than through an Application Program Interface ("API") as would a real client, even more room for error is introduced necessitating some form of compensation to translate any raw results into meaningful data. The fundamental problem in assessing the number of users supported by a server application using these techniques occurs because the techniques do not take into account real user activity and resultant timing of network operations between client and server.

These types of mechanized request-response strings can be a helpful tool in ascertaining ultimate server capabilities in handling raw task throughput and for stress testing servers, but they do not capture server results from the perspective of the actual user. The mechanized request-response string approach still requires much effort to arrive at meaningful and accurate user response expectations under normal user conditions. Again, without modeling actual user behavior in some way, this form of testing may tell how many requests a server can handle without necessarily arriving at a meaningful answer as to how many clients, and hence actual users, a server can support.

Another simulation approach of limited value is mathematically modeling the network, server, multiple clients, and user behavior. With this approach, an appropriate model would be developed to represent the operational and timing characteristics of each constituent part of the model as well as how they relate one with another. The interaction of those parts would be simulated in a computer based model to determine hypothetical response times based on the model. The accuracy and meaning of the response times from the perspective of the user can only be as good as the accuracy of the entire model. To build a model of such a caliber is a highly complex and time consuming task and would be fraught with opportunities for error. Furthermore, rapid changes in the development of computer hardware and the vast array of different types of hardware would require constantly updating the model.

SUMMARY AND OBJECTS OF THE INVENTION

It is a general object of the present invention to provide a way of simulating clients and user behavior operating those clients thus maintaining user perspective to response time and retaining the benefits of actually building and running a desired network configuration while simultaneously reducing the amount of hardware in terms of client computers as well as the manpower to run such hardware.

It is a related object of this invention to simulate a plurality of users on a single client computer in order to assess server performance with a simulated client load with minimal hardware requirements.

Other objects of this invention include the ability to determine how many clients a given server can adequately support; to ascertain a weighted average response time for a variety of user initiated tasks; to reduce the manpower associated with simulating a large user load; to run large server load simulations with relatively small amounts of hardware; to consolidate actual user characteristics in terms of activities and frequencies into a client profile for simulation of clients; to create simulated but realistic load conditions on a given server in order to assess projected server resource utilization; and to send tasks to the server through the same interface that an actual client would use to better simulate information flow of an actual client.

Additional objects and advantages of the invention will be set forth in the description which follows, and in part will be obvious from the description, or maybe learned by the practice of the invention. The objects and advantages of the invention maybe realized and obtained by means of the instruments and combinations particularly pointed out in the appended claims.

To achieve the foregoing objects, and in accordance with the invention as embodied and broadly described herein a method, system, and product for assessing the performance of a server application is provided.

The invention relates to systems, methods, and computer program products for providing realistic load conditions on a server so as to simulate the behavior of multiple clients and user behavior operating those clients. An intrinsic model in the present invention is a user operating a client and performing various activities. All of the normal daily activities that a user will perform are then reduced to a number of user parameters that can be stored in a client profile. The user parameters correspond to the nature, timing and frequency of the user activities.

In order to simulate users, the present invention makes logical connections between the client computer and the server. Advantageously, services provided by multi-tasking multi-threaded operating systems can be utilized to initiate, manage and control each logical connection so as to appear to the server as a plurality of separate and distinct clients. Typically, a single process or single process thread is initiated by a main program running on the client computer to make the individual logical connection. In a multi-tasking, multithreaded operating system environment, multiple threads can be initiated under multiple processes under the control of a client program.

Each logical connection can simulate a user by generating tasks that correspond to the nature, timing, and frequency of user activities in operating a client. The present invention is able to do this because of the user parameters stored in the client profile that insures that the tasks generated are very similar to tasks that a real user would generate in terms of task selection, frequency, and timing, as opposed to a mechanical, random generation of tasks. The generated tasks are communicated to the server across a communications network by exchanging messages with the server according to typical protocols. The present invention schedules the generated tasks over a given time period, typically a day, and introduces random elements into the scheduling in order to simulate the natural variability of actual user behavior. Again, the focus is on simulating actual user behavior and not simply bombarding the server with tasks.

Response times for the completion of the generated and communicated tasks are measured and tabulated. This information may then be analyzed in a number of ways in order to assess server performance under a certain client load. For example, the information can be used to determine the number of users that a server can adequately handle.

One preferred embodiment, uses a LoadSim client to simulate several hundred Microsoft® Exchange™ E-mail clients as if being run by actual users to provide realistic load simulations on a Microsoft Exchange E-mail server. The load simulations provide accurate and realistic feedback as to the response times of an actual Exchange client, and hence user, is likely to encounter. The invention takes advantage of multi-threading, multi-processing and shared memory features in Windows NT™ to create and manage up to several hundred simulated users on a single client computer. Each user appears to the Exchange server as a separate Exchange client, though each simulated user is actually a process thread under the direction of a single LoadSim client running on a single client computer.

The LoadSim client is able to simulate users by making logical connections to the Exchange server for each simulated user and then sending tasks over the logical connection that correspond to user activities, such as browsing mail, sending mail, deleting mail, etc., that an actual user would normally perform. The key to modeling an actual user is creating a client profile composed of user parameters corresponding to user behavior.

One important test that can be used alone or as a precursor to the user load simulation is the initialization of users test. This test logs onto the server, making a logical connection for each simulated user, and creates the folders and other account information associated with that user. Furthermore, this test will initialize the users to a known state by placing messages in the users' folders, including the users' inbox.

With each user account on the Exchange server initialized to a state simulating the natural account condition of a daily Exchange user, the network administrator is ready to run a user load simulation. This test draws on the user parameter information from the client profile to cause each simulated user to process different user activities and initiate respective client tasks. Next, each of these tasks are scheduled for execution at different times during the day with some random variability introduced to imitate natural variations in daily user activities. Finally, each task is timed and this response time is kept in a log file for later performance analysis.

Once the user load simulation test has been run, the response time results may be analyzed to determine whether or not the server or servers are adequately handling the specified number of users. One method of analyzing those results is to create a single weighted average 95th percentile response time number representative of the average response time a user may expect to encounter 95% of the time. Graphs may also be made of a number of weighted average response times corresponding to different numbers of users to view important trends. This will assist the network administrator in determining how many users an Exchange server can support and plan growth accordingly. This invention successfully provides realistic server performance simulations with reduced hardware requirements and does so better than has previously been known while providing accurate results to an inquiry as to how many users a given server can support. Clearly, those skilled in the art will recognize other response time based statistics may be developed.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE
PREFERRED EMBODIMENTS

As used herein, the term "server application" refers to software written according to the client-server model and that runs on a server computer. A "server" as used herein refers to a server application running on a server computer. A networked system of computers may have multiple servers for a given application and additional servers are added for increased client loads. A server is designed to communicate with, and process requests from, client software running on a plurality of client computers. Furthermore, a server may communicate with other servers as necessary. For example, one server may route a request to another server for processing or servers may communicate one with another to synchronize a common database.

A client computer is any computer separate from the server computer that has a physical connection through a communications network to the server computer. A "client" as used herein refers to client software running on a client computer corresponding to, or interacting with, a server application. The client becomes logically connected to a server in order to communicate requests or messages for processing to the server. A "logical connection" as used herein refers to the connection between a client and a server that occurs through a communications network. Typically, many logical connections are supported by a single physical connection between client computers and server computers.

When referring to a client, it is assumed that there is an associated user operating the client software. As the user operates and interacts with the software, the client sends tasks composed of one or more processing requests, known as messages, to the server. The tasks are associated with the user activity and generally the user awaits the completion of a task before continuing onto other activities. For example, a user activity and corresponding task at the client may be logging onto a database server. The messages associated with the client task may be a request for connection sent by the client, a verification of user identity message sent by the server, verification of the password sent by the client, and confirmation of connection with associated connection information sent by the server to complete the task.

As used herein "response time" is the time it takes for the client to send and receive all messages to a server to complete a task and is a critical performance measurement. Typically, as long as the response time does not cause user discomfort or irritation, a server is adequately supporting the numbers of clients logically connected thereto. Other factors that indicate poor server performance may not be reflected in a user response time analysis such as server errors, slowness in performing tasks not seen by the user directly, etc. Once response time crosses a certain threshold, typically that level which will elicit user complaints, a server cannot support any more clients (users) and another server or servers should be added to bring response time within acceptable levels. Alternatively, more resources can be added (e.g. memory, disk space) on the existing server or the existing resources can be allocated to the server application (e.g. shifting some applications to another server computer). A preferred embodiment of this invention will combine response times for a number of different user controlled client tasks weighted according to importance so as to have one weighted average response time statistic to measure server application performance.

A "communications network" as used herein is to be interpreted broadly and includes, but is not limited to, local area networks, telecommunications networks, wide area networks, modem connections, etc. Typically, a communications network will comprise a physical component or physical connection that is made up of the wiring, interface cards, and other hardware combined with a specified communications protocol and associated software.

A "storage means" is defined broadly to incorporate any type of device interfaceable to a computer that is used to memorize information and includes both long-term and short-term storage. Thus storage means would include though not be limited to cache memory, RAM, disk storage, tape storage, etc. Furthermore, storage means contemplates the entire system of storage incorporated by a computer in combination so that the RAM, cache, and disk drive together could be considered a storage means. A storage means can also be logically partitioned so that items are stored in different media or in different parts of the same media. For example, a storage means comprising RAM and disk storage could be logically partitioned so that item A is stored in a portion of RAM (first partition), item B is stored in another portion of RAM (second partition), and item C is stored on disk (third partition).

To better understand the present invention, one preferred embodiment is presented where a Microsoft Exchange E-mail server is the subject of performance assessment and load simulation. The invention as embodied utilizes a LoadSim client that will simulate a plurality of users while running on a single client computer and is referred to throughout the application as the LoadSim embodiment. It will be appreciated by those skilled in the art that other e-mail server applications or virtually any server application can be the subject of performance measurements according to the method, system, and computer program product used to illustrate the invention in the foregoing embodiment.

Referring to FIG. 1, a generic server application running on a server computer is illustrated as server 20. The server 20 is part of a typical local area network 22 that has a plurality of clients $24_1$–$24_{200}$ attached. In this example, each client $24_n$ is a client application running on a separate client computer and presumably operated by a separate user. As depicted in FIG. 1, this would be a total of 200 client computers and 200 users. FIG. 1 can represent either the proposed network configuration to be tested or an example of the resources required to simulate such a configuration in a traditional approach that wishes to retain the benefits of having relevant response time information measured from the user perspective. Even if each presumed user at each client $24_n$ were replaced by automated scripting programs to represent user operation of the client, there still exists the hardware requirement of having 200 physical computers to run each client $24_n$.

Figure 2:
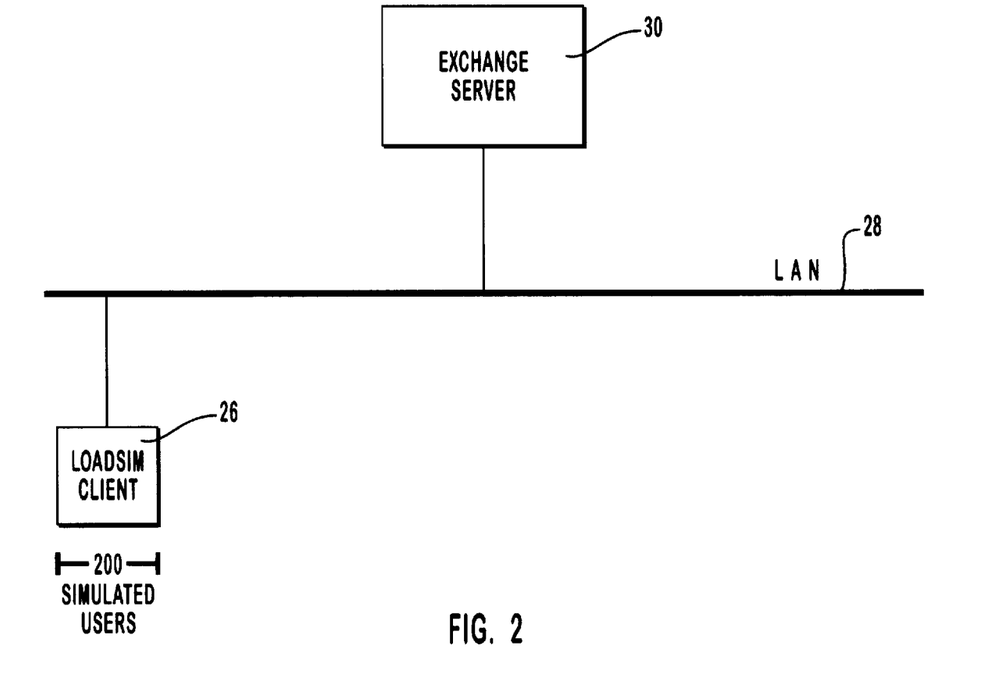
FIG. 2 shows an embodiment of the present invention working with an Exchange mail server on a local area network. A LoadSim client simulates two hundred users from a single computer and appears to the Exchange server as two hundred clients running on two-hundred different computers similar to FIG. 1 above.

FIG. 2, by contrast, shows a single LoadSim client 26 comprising software running on a client computer, that will simulate 200 users. The LoadSim client 26 is attached to a local area network 28 in order to interact with Exchange server 30. To the Exchange server 30, the single LoadSim client 26 appears equivalent to 200 separate Exchange clients interspersed throughout the local area network 28, each running on a separate client computer. The contrast in configuration and hardware between FIG. 1 and FIG. 2 clearly shows a major advantage of this invention, namely the reduced hardware requirement for simulating a specified number of users. Furthermore, fewer human operators are required to run user simulations and less user test scripting need be written.

Figure 3A:
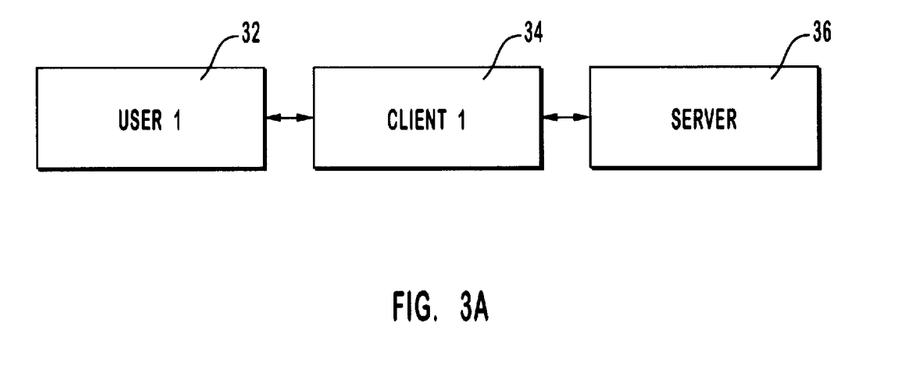
FIG. 3A shows a block diagram depicting user interaction with a client, the client in turn communicating with the server.
Figure 3B:
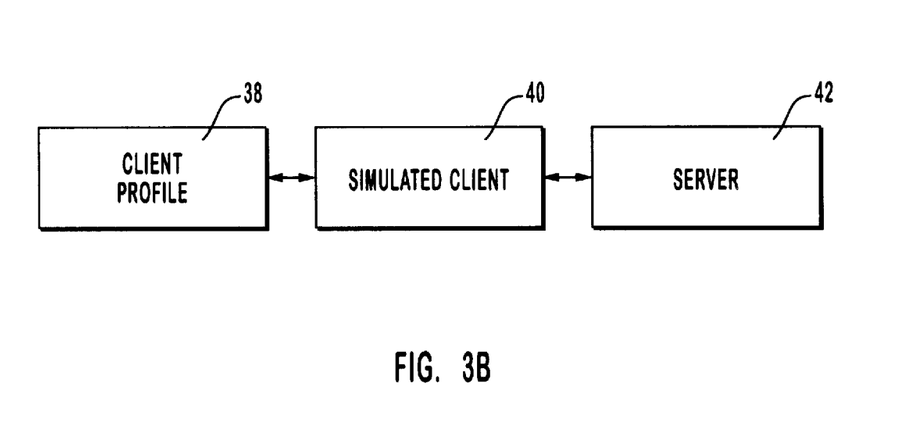
FIG. 3B shows a block diagram depicting the user simulation model of the present invention where a client profile provides information to simulate user behavior to control operation of a simulated client, the simulated client in turn communicating with the server.

FIGS. 3A and 3B depict the parallel models between a complete network configuration as shown in FIG. 1 and the simulated load provided by LoadSim client shown in FIG. 2, respectively. FIG. 3A shows the actual relationship between a user, the client operated by the user, and the server. Basically, a user 32 operates and controls client 34. The client, in turn, will process tasks representing user activities by sending and receiving messages to the server 36.

FIG. 3B shows the analogous relationship existing in a LoadSim client where a client profile 38, having different user parameters to simulate actual user behavior, will interact and be used to control a simulated client 40. The simulated client 40 will process tasks representing user activities based on the user parameters found in the client profile and send and receive messages with the server 42 to complete the tasks. A common client profile 38 may be used to control multiple simulated clients 40 in order to save network administrator time to input information on each of potentially large numbers of simulated users. In this manner, the operator of the LoadSim program will enter the client profile 38 user parameters one time and from the client profile 38, be able to generate and control a plurality of simulated clients.

One great advantage to using a client profile having user parameters to simulate real user behavior for controlling simulated client 40 is the ability to create more realistic load situations. If simulated client 40 were controlled by parameters that did not simulate real user behavior, the loads seen by the server would be artificial and the performance analysis based upon those loads would not give an accurate picture to how many clients the server could support or whether response times for completed tasks would be an accurate reflection of what a real user would see. This inaccuracy problem occurs by simulation methods directing tasks at the server without consideration of how those tasks are initially generated (i.e. by real user activity based on user behavior patterns.) Therefore, it is an advantageous element of this invention to simulate the behavior of user's operating simulated clients rather than simply exercising the server with discrete tasks.

Figure 4:
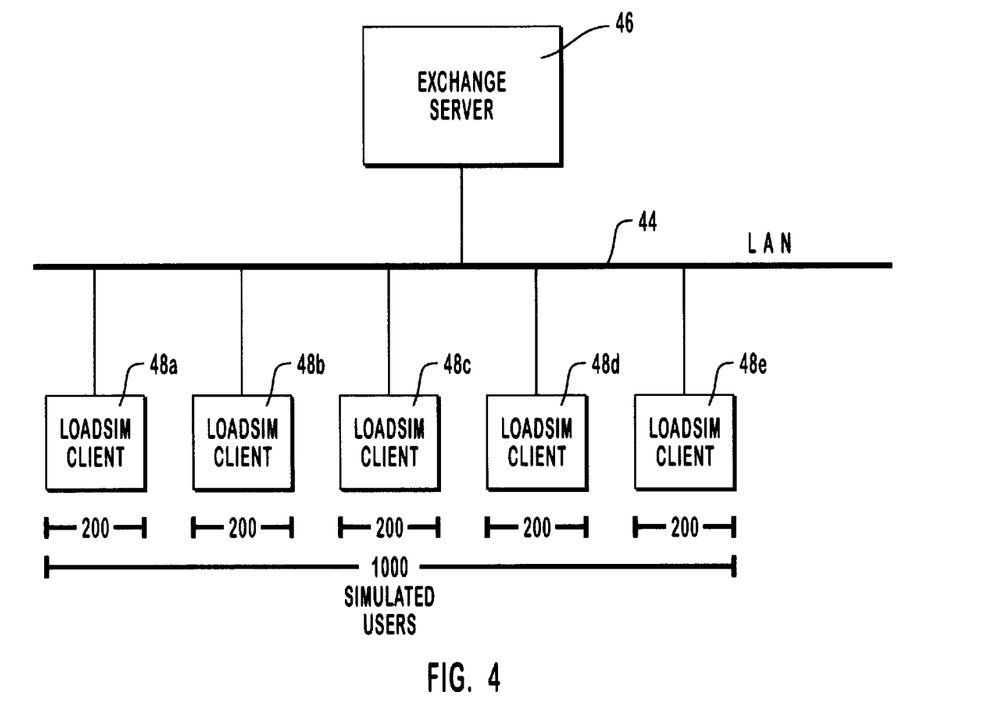
FIG. 4 is a block diagram showing one-thousand simulated users being generated by five LoadSim clients running on five separate computers, each LoadSim client simulating two-hundred users.
Figure 5:
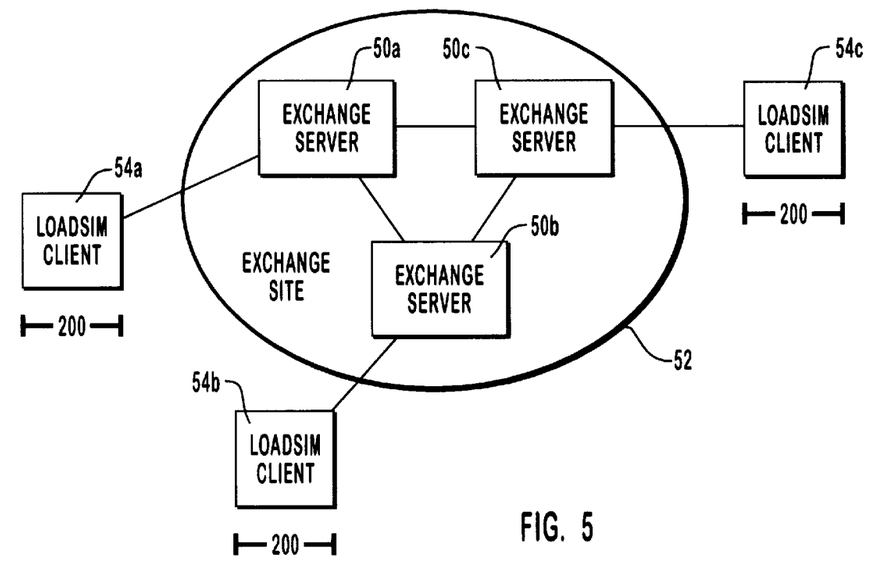
FIG. 5 shows an alternate network topology utilizing the current invention where multiple Exchange servers comprise an Exchange site with LoadSim clients being connected to the separate Exchange servers, with each LoadSim client simulating up to 200 users.

FIGS. 4 and 5 show the flexibility of the present invention to be used in different scenarios. Each network site running Exchange servers will have different topologies and different load requirements that this invention may address.

FIG. 4 shows another local area network 44 having an exchange server 46 where multiple LoadSim clients 48a–48e are configured to simulate 1,000 users. In this manner, embodiments of this invention can be used to simulate very heavy user loads on servers thereby making it a very flexible and adaptable tool in the hands of a network administrator.

FIG. 5 depicts another way of using the LoadSim embodiment of the present invention for use with Exchange servers. Exchange servers 50a–50c make up an Exchange site 52 that services Exchange clients and users throughout the entire site. LoadSim client 54a is connected to Exchange server 50a to simulate loads created by 200 users on Exchange server 50a. In like manner LoadSim client 54b is connected to Exchange server 50b, and LoadSim client 54c is connected to Exchange server 50c.

The arrangement in FIG. 5 clearly shows how this invention can be used to analyze performance at a site where multiple servers are involved. Multiple servers will change the dynamics in that the servers will communicate with each other on behalf of clients attempting to send E-mail to users who pertain to a different server. In a complicated scenario as shown in FIG. 5, it becomes even more important to simulate behavior from a user perspective and to measure response times from the point of view of the user rather than each individual server because of server intercommunications that may influence user perspective response times.

Figure 6:
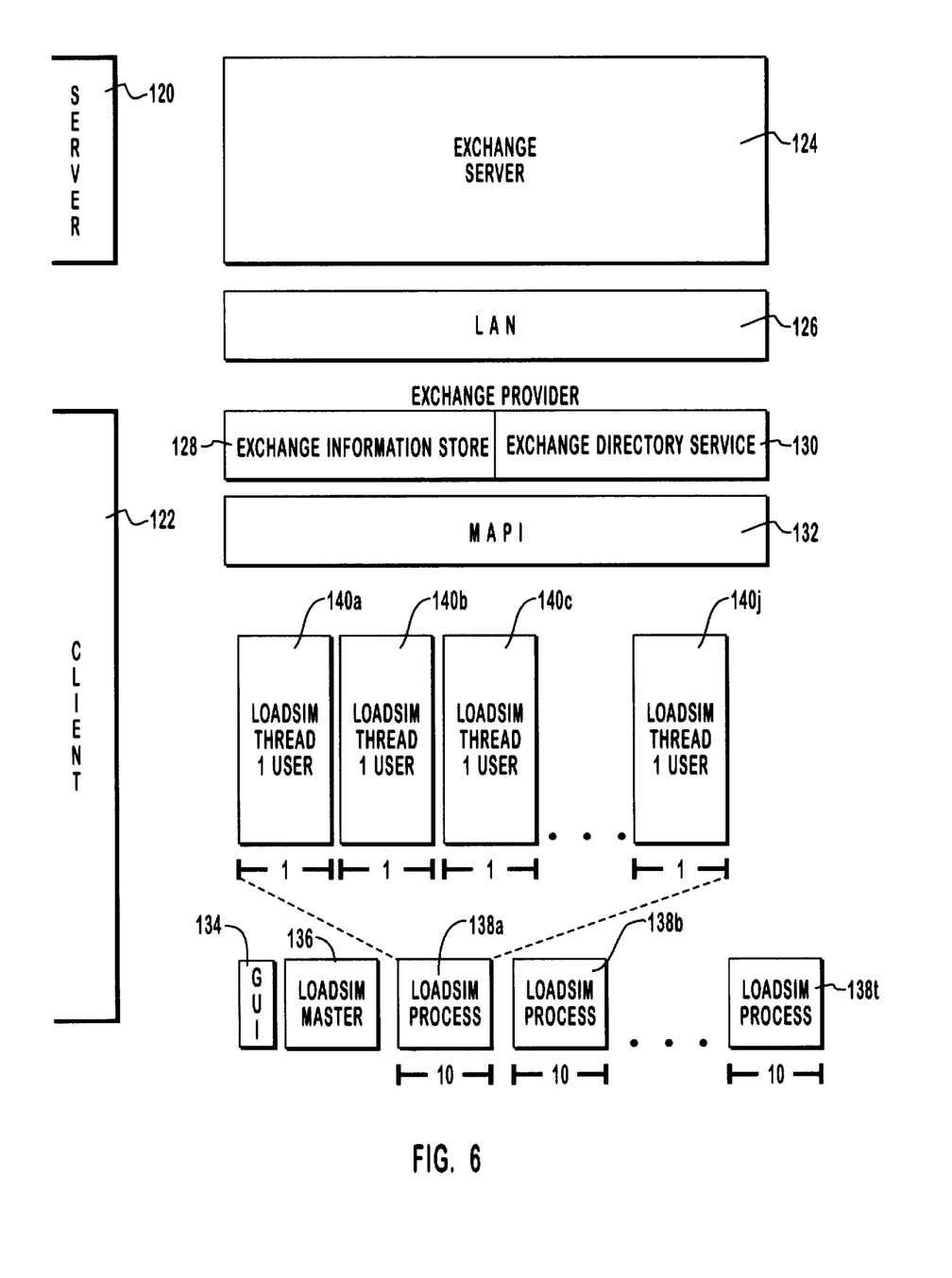
FIG. 6 shows the internal architecture of the LoadSim embodiment of this invention used to simulate users and acquire performance data on an Exchange E-mail server.

FIG. 6 shows a map of the internal architecture of a LoadSim client. The server computer 120 is running an Exchange server 124 that communicates through local area network 126 to client computer 122 running a LoadSim client. The LoadSim client comprises the LoadSim graphical user interface 134, the LoadSim master process 136, and a plurality of LoadSim servant processes 138. The master process 136 initiates and controls the plurality of servant processes 138a–138t and will create as many as necessary to simulate the designated number of users that is specified in a simulation file.

Each servant process 138a–138t is composed of a plurality of LoadSim servant process threads, with each thread representing a simulated user. Each servant process 138a–138t has 10 threads 140a–140j and therefore represents 10 simulated users. In particular, FIG. 6 shows LoadSim process 138a having a plurality of LoadSim threads 140a–140j. Each LoadSim thread 140a–140j makes a logical connection with the Exchange server 124 and controls simulated user behavior. Again, the simulated user behavior is controlled by the user parameters that are found in the client profile.

In order to communicate with the Exchange server 124, each servant process thread 140 will communicate through the Massaging Applications Programming Interface (MAPI) 132 that is the same interface used by actual Exchange clients. MAPI 132 communicates primarily with two components that comprise the Exchange provider, namely the Exchange Information Store provider 128 and the Exchange Directory Service provider 130. Together, the Exchange directory service provider 130 and the Exchange information store provider 132 give access to the Exchange server 124 by communicating messages over LAN 126. Detailed information regarding the MAPI, the Exchange Information Store, and the Exchange Directory Service is set forth in "Win32 Software Development Kit" (Microsoft Developer Network, January 1996) and is hereby incorporated by reference. Furthermore, Exchange server architecture information is found in "Microsoft Exchange Server Software Development Kit" (Microsoft Developer Network, April 1996) and is hereby incorporated by reference.

Figure 7:
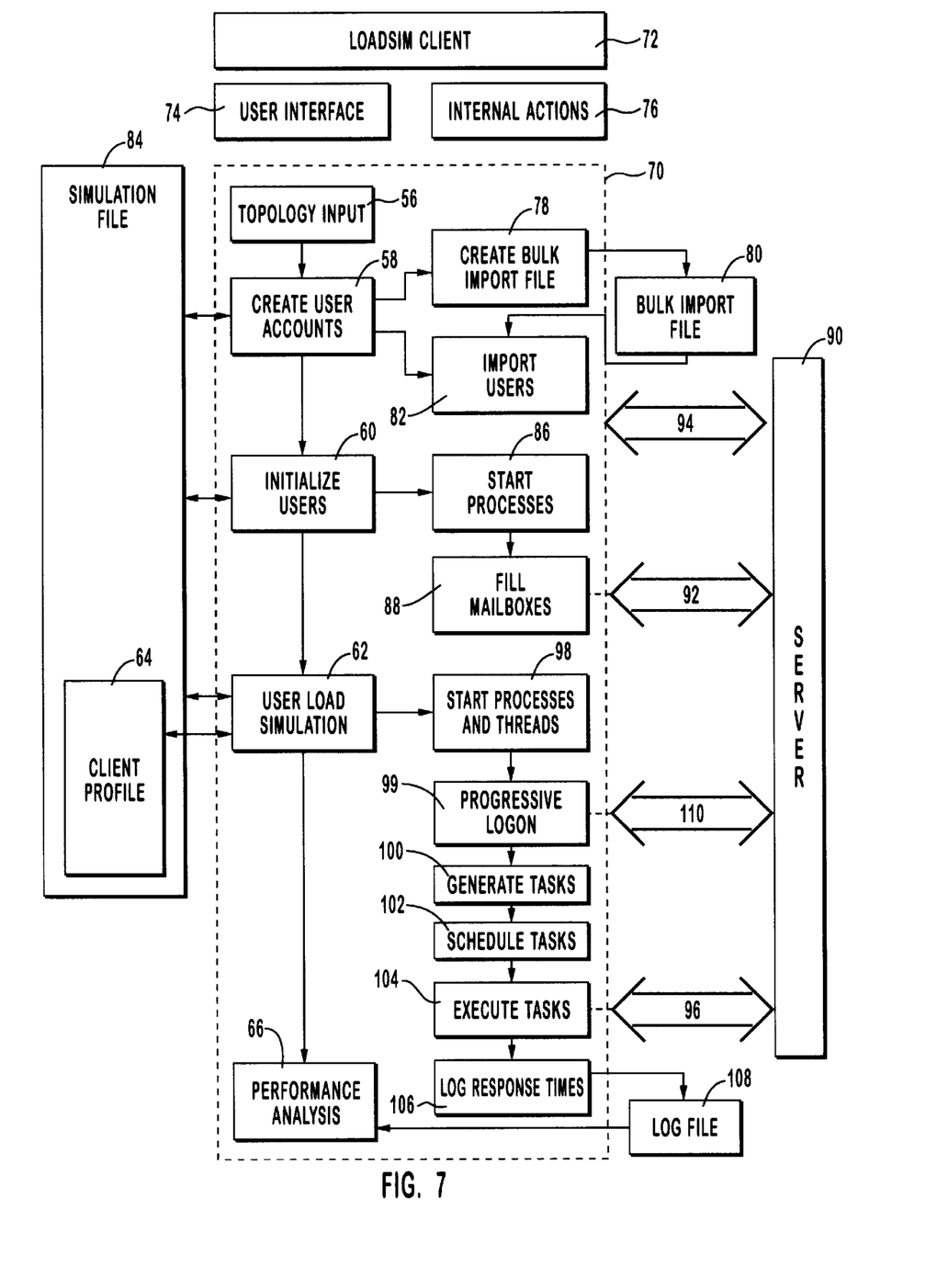
FIG. 7 shows an overview composite block diagram of the LoadSim client depicting files created, user interface interaction steps, internal processing steps, and interaction points with an Exchange server.

FIG. 7 shows an overview of the LoadSim client operation. The LoadSim client 72 is theoretically broken into user actions and control through the user interface block 74 and internal operations that accomplishes interactions with the server at internal action block 76. The steps associated with the LoadSim client operation are all enclosed by dotted line 70 with actions more pertinent to user action through the user interface on the left and those steps corresponding to internal actions and interaction with the server on the right. Corresponding steps to the user interface block 74 and the internal actions block 76 are found directly below these items while the LoadSim client block 72 encompasses the steps bounded by broken line 70.

Under the user interface block 74, the generalized process flow of the network administrator using the LoadSim client is presented. First, server topology information must be acquired as represented by topology input step 56. Some implementations may do a form of auto sensing to automate this process or this information may be acquired from some existing source. Topology information includes the number of servers, the server names, the number of sites, site names and information, etc. All topology information is stored in simulation file 84 for future reference in running different tests.

All user accounts must be created as represented at create users step 58. Creating the users is a two step process that initially requires a selection of how many users per server are desired. LoadSim then creates a bulk import file 80 at create bulk import file step 78, the bulk import file 80 being of such format so that it is understandable to an Exchange server. Next, the network administrator may use the Exchange administrator program to create the new user accounts or, alternatively, the LoadSim client may create those user accounts at import users step 82.

Before doing a full load simulation on the server, the individual user accounts must be initialized to a state that simulates a normal user's mailbox. A mailbox that is used daily or relatively often by an active user will have saved messages organized within folders for storage as well as previously read mail remaining in the inbox. The actual E-mail messages for all Exchange users are associated with a particular Exchange server and stored at the Exchange server in an information store database. It also becomes necessary to simulate actual database size as well as to have realistic information stores for assessing accurate Exchange server performance.

The simulation file 84 contains all the information regarding a LoadSim client test run including the client profile 64 that stores user parameters that simulate user behavior by specifying the nature, timing, and frequency of tasks that the simulated clients will perform. All information input by the user through the user interface is stored in the simulation file 84 for future reference. The simulation file 84, including the client profile 64, is typically stored on a hard disk logically and physically attached to the CPU of the client computer. It is noteworthy that the client profile 64 or parts thereof may be stored in any area or portion of the storage system in the LoadSim client computer whether that be RAM, hard disk, or other media, or combinations thereof The network administrator inputs information relating to the initialization of users at initialize users step 60. The information is stored in simulation file 84 for future reference and includes, but is not limited to, the following: the number of folders, the average number of messages in each folder, a minimum and maximum number of messages per folder, the average number of messages contained within the inbox, the number of processes used to initialized users, type of messages used to fill folders and inboxes. The messages used in the described embodiment advantageously have certain properties and characteristics that are the same as an actual Exchange client so as to better simulate a real user message thereby creating better simulated results by simulating the data (message) a real user would use as well as the activities a real user would perform.

The initialization of users at step 60 can be a test by itself because it tests the server's ability to create user accounts and fill the Exchange information store. Though the Exchange server has basic account information regarding each simulated user from the bulk import file 80, an Exchange server will not create a user account folder structure until the user logs on for the first time. Its main purpose, however, is to set the mailboxes to a state that represents active users. In this way, the user load simulation test at step 62 will more accurately reflect real life conditions.

At user load simulation step 62, the client profile 64 is created by network administrator input of user parameters. The client profile 64 will be used to control the operation of the simulated clients during the user load simulation step 62. The client profile 64 has user parameters that indicate the nature, frequency, and timing of user activities that translate into tasks for the simulated clients, with the user activities chosen to best represent a model of what actual users do while operating an Exchange client. The main user activities include sending new mail, reading new mail and selecting an appropriate response for each of the new messages, and reading previously read or "old" mail and again selecting appropriate responses for each of the messages. The following table shows a non-exhaustive list of user activities or simulated client tasks and how those tasks are specified in the client profile 64.

TABLE A

| Task | Description |
| --- | --- |
| Send New Mail | This task simulates creating and sending a new mail message. Options include the number of times per day new mail is sent, whether or not to save a copy of the mail message in a sent folder, the number of recipients to receive the mail message, whether distribution lists should be included in the recipient field of the mail message, and the destination of the mail message (local, site, or organization). |
| Read Mew Mail | This task represents the process of reading new mail messages that come into the inbox and is used in conjunction with other tasks such as |

TABLE A-continued

| Task | Description |
| --- | --- |
| | Reply, Delete, etc. to process each individual new mail message. Options include the number of times per day that new mail is read and the actions taken on each of the mail messages on a percentage basis (i.e. 30% Reply, 10% Delete, etc.) |
| Read Old Mail | This task represents the process of reading existing or "old" mail messages that are left in the inbox and is used in conjuction with other tasks such as Reply, Delete, etc. to process each individual existing mail message. Options include the number of times per day that old mail is read and the actions taken on each of the mail messages on a percentage basis (i.e. 30% Reply, 10% Delete, etc.) |
| Move | Move a mail message from the inbox to a folder. Specified to operate on a percentage of existing mail messages. |
| Delete | Delete a mail message from the inbox. Specified to operate on a percentage of the existing mail messages. Furthermore, a specified maximum number of mail messages for the inbox may be specified and any more than that number will be deleted. |
| Reply | Reply to the sender of the mail messages with another mail message. Specified to operate on a percentage of existing mail messages. |
| Reply to All | Reply to the sender and all other recipients with another mail message. Specified to operate on a percentage of existing mail messages. |
| Forward | Forward the mail message to one or more other recipients. Specified to operate on a percentage of existing mail messages. |
| Copy | Copy the mail message intp a folder. Specified to operate on a percentage of existing mail messages. |

The network administrator will input the specified user parameters corresponding to real user activities at step 62 for storage in the client profile portion 64 of the simulation file 84. The client profile 64 will also be available to other internal elements of the LoadSim client 72 as will be explained hereafter. Other preferred information stored in the simulation file 84 includes the length of the work day, whether to use distribution lists, what files to use for the actual mail messages, etc.

More user parameters can be used and the purpose of user parameter definition and selection is to create a model of actual user activity that is as close as possible to the real conditions of a given Exchange site. The appropriate value to be assigned to the various user parameters can be ascertained by surveying users or monitoring actual system usage. Actual condition monitoring is important since each organization may have unique Exchange usage characteristics.

It is important that realistic values are chosen for the user parameters to avoid overloading the system. Overloading or message explosion is a distinct possibility since a positive feedback loop of mail messages between users may be created when more mail messages are generated than are deleted and when mail messages generate even more mail messages due to automated reply and forward operations based on percentages of existing messages.

One safety mechanism exists that allows the network administrator to see the total number of messages that will be generated throughout the simulation in order to avoid positive feedback loops that will overload the communications. Typically, such feedback loops occur when unrealistic parameters are chosen.

Another safety mechanism to prevent message explosion caused by positive feedback loops is implemented called automatic message generation damping. A LoadSim client will track how many times a given message has been forwarded or replied and diminish, by a damping factor, the chances of that same mail message being forwarded or replied again. This occurs for each successive iteration with the damping factor having increasing impact until eventually extinguishing any possibility of reply or forward. For example, if 10% of mail messages are forwarded and the damping factor is chosen to be 0.5, LoadSim will reduce the chances of double forwarding to 5%, of triple forwarding to 2.5%, etc. In this way, the overall number of messages that will be generated is reduced and the system "converges" to a predictable and steady state as opposed to diverging in an unbounded way with ever increasing numbers of messages generated over the passage of time. The damping factor is chosen to simulate real user patterns and it is important for proper simulation of user activity.

In order to make the client definition process easier for the network administrator, a simple selection as to low, medium, or high client usage can automatically fill in the various client profile 64 user parameters with preset values based on statistical averages. In this way, a network administrator may quickly and easily initiate a simulation.

The client profile parameters ultimately indicate the nature, timing, and frequency of user action that is eventually exhibited in client task generation. As explained previously, the parameters hold information such as the number of times per day the user checks the inbox, what percentage of the inbox items are deleted, replied to or forwarded, how many times per day a user sends new mail and the nature of that new mail (size of message or whether there is an attachment or not), etc. The nature of a task includes, among other things, what the particular task will accomplish, such as replying to a message or deleting a message. The timing of tasks insures that tasks follow the logical order as a real user would initiate them (i.e., replying before deleting mail messages). Frequency refers to how many times per day or other time period the tasks are executed.

After inputting the user parameters, the network administrator will start the simulation at user load simulation step 62. The LoadSim client will start the processes and threads to simulate users at start processes and threads step 98. The LoadSim client is written to work on a Windows NT operating system to take advantage of the multi-tasking, multi-threaded abilities inherent therein. LoadSim utilizes such capabilities by having multiple threads under multiple processes (as opposed to multiple threads under a single process or multiple processes having a single thread each) with each thread simulating a user.

Furthermore, it is necessary for each simulated user to logon to the Exchange server. A progressive logon method is used at progressive logon step 99 so that all simulated users do not attempt to logon simultaneously and logon continues until all simulated clients have made logical connection with the Exchange server 90 by exchanging messages with the Exchange server 90 as represented by arrow 110. By default, once a simulated user is logged on, it will remained logged on throughout the duration of the simulation. Since real users may logon and logoff intermittently during the day, the LoadSim client as presently constituted has optional settings that can be selected to logoff a simulated user if there is not a scheduled task for over 30 minutes (or other specified time period), and logging the particular simulated user back onto the Exchange server 90 shortly before the next scheduled task.

The interface means that allows the LoadSim client 72 to logon on behalf of a simulated client and establish a logical connection is the communications network combined with the network protocols and Exchange architecture protocols for establishing a logical connection between a client and a server. An actual user would make a logical connection from one computer running one Exchange client while, each simulated user makes a logical connection from one computer running a LoadSim client 72 that establishes the appropriate messaging protocols. In this way, many logical connections result from a single LoadSim client 72 since the connection messaging protocols are run multiple times during the operation of the LoadSim client 72. The LoadSim client 72 uses the multi-tasking, multi-threaded capabilities of Windows NT to actually execute program code for controlling the connection messaging protocols and running them multiple times to make a plurality of logical connections.

The LoadSim client 72 will generate a host of tasks based on the client profile 64 at step 100. These tasks will represent actual user activity and will be so timed that it will appear to the Exchange server 90 that the messages generated in response to executing the tasks actually come from an Exchange client. A number of messages may be communicated back and forth between the simulated user and the Exchange server 90 to complete a given task depending upon the nature of that given task.

The task response time will parallel actual user response time in part because the same API is used by the simulated Exchange clients to access the Exchange server 90 as a real Exchange client would use. While other performance methods may access an Exchange server directly, the LoadSim client will access the server through the MAPI as will any other Exchange client.

Tasks are scheduled for execution at schedule tasks step 102 with a random element introduced to get more realistic asynchronous task requests as opposed to artificial and predictable patterns. Initially, a base point is determined for each task based on the number of times a task is done per day and the number of hours in a work day. This base point time is increased or decreased by up to 50% of the time between base points in order to get a relatively even distribution with a random element introduced. This is done to simulate user variability in executing tasks, as well as to prevent tasks from being unnaturally bunched together.

It is worth noting that many things can be done with the timing of task execution to simulate different situations. Some embodiments may have peak times, such as mornings or evenings, where task execution is more highly concentrated to simulate real user behavior of processing E-mail first thing in the morning upon arrival at work and at the end of the day as they are leaving. Other usage patterns noted at a particular Exchange site may be simulated in the timing of task execution as appropriate. Additionally, new tasks may scheduled dynamically during the operation of the simulation in response to previously executed tasks or otherwise. Those skilled in the art will see that some implementations may generate the tasks themselves dynamically and that many variations regarding task generation, scheduling, and timing may be envisioned, all within the scope of the present invention.

The tasks are scheduled and given an initial time stamp so that response times may be computed. As a task comes up for execution at execute tasks step 104, the appropriate process and thread are awakened and the task processed. Internal communications between the LoadSim client 72 and the processes and threads corresponding to the respective simulated users are done through the shared memory facility of Windows NT. The task is executed by requests to the MAPI interface that will in turn generate the sequence of messages to the Exchange server 90 over the communications network as illustrated by arrow 96.

Program code running on a CPU and having access to client profile 64 information constitutes means to manage and control the generation, scheduling, and execution of tasks. The communications network physically connecting the LoadSim client 72 to the Exchange Server 90, with associated network protocols and Exchange application protocols forms an output means to communicate tasks to the Exchange server 90 and an input means to receive responses to those tasks from the Exchange server 90.

Though there is a risk of a client computer hardware bottleneck that would skew response time results should too many Exchange clients be simulated on a single client computer, experimental results have determined that 1000 simulated users poses little problem with respect to overloading hardware resources of commonly available PCs. Other considerations that influence an appropriate number of simulated users for a LoadSim client include communications network throughput rates and communications network interface card specifications. Of course, advances in computer hardware performance will tend to increase the number of simulated users a single LoadSim client can handle. Conversely, lower performance hardware found on older computers would tend to decrease the number of simulated users comfortably supported by a single LoadSim client.

Once a task is completed, the total time for completion is calculated at log response times step 106 with the result being stored in the log file 108. The log file will include information on each task executed including the type of task, and the total completion time or response time. Furthermore, the individual actions that make up a task are also recorded giving more complete information should further analysis require. A "task" is defined flexibly to meet the needs of the implementation and includes the smallest measurable operation between client and server as well as aggregates of operations logically related to simulate elemental user action or even more complex aggregates to simulate complex user actions. For example, a delete message may be an aggregate of one or more message transactions between client and server while a read and delete all messages contained within a folder would likely entail a large number of message transactions, including a number of delete message operation. The log file 108 response times are best possible case user response times since they are measured at the MAPI interface level and negate user initiated pauses and delays and the relatively negligible processing overhead of an actual Exchange client.

It is noted that log file 108 is typically stored on a hard disk that is part of the storage system of the computer user by the LoadSim client 72. The response times may be stored and used within the RAM of the same computer as desired. In this way, the response times are stored in a certain area or partition of the overall storage system, whether in RAM or on disk elsewhere.

After the execution of the user load simulation at user load simulation step 62 analysis of the simulation results represented by the task response times found in the log file 108 occurs at performance analysis step 66. Those skilled in the art will undoubtedly see many ways to utilize the log file 108 data to assess the Exchange server performance. Though an example follows herein, it is not to be read as limiting in the way results are used for performance analysis.

Performance analysis step 66 comprises ordering the response times found for each type of task from the quickest to the longest and taking the 95th percentile response time for each type of task. The 95th percentile response time or task score represents the response time for completion of a task 95% of the time. In other words, a user should expect a task associated with user activity to be completed at this value or less 95% of the time. The 95th percentile has been found to give satisfactory results though meaningful results could be acquired using other percentile levels. Further, those skilled in the art will see that other response time based statistics could advantageously be used as part of the present invention.

Each type of task receives a task score and these may be viewed individually if desired in some embodiments, but are built into a single composite score called the weighted average response time at step 66. The weighted average response time is calculated by first, determining which types of tasks are of concern, second, assigning a numerical weighting to each task type, third, multiplying each task type 95th percentile score by its weighting to get a task type weighted score, fourth, summing the individual task type weighted scores to arrive at a total, and fifth, dividing the total by the sum of the numerical weightings to arrive at the weighted average response time. The weighted average response time is the upper bound on response time a user is likely to encounter under statistically normal user operation patterns for the numbers of Exchange clients supported by the Exchange server as determined by the LoadSim client simulation. Typically, all task types are considered relevant with the numerical weightings giving relative weight to the different task types according to the user behavior at a given installation.

Network administrators may make graphs of the weighted average response times of different client loads for an Exchange server to aid in determining when another Exchange server should be added to the network. A threshold value for the weighted average response time, based on historical analysis of real user frustration and comfort level, is typically used for determining when another Exchange server should be added to the network or, alternatively, if the existing Exchange server performance can be enhanced to an adequate level by adding resources or freeing up existing resources.

The weighted average response time will be stored in a portion or partition of the storage system found on the LoadSim client computer. This memory partition could be in RAM, hard disk, or other storage media that comprises the entire storage system.

The LoadSim client can be implemented as a computer program product wherein a computer useable medium such as one or more magnetic disks or CD ROM has computer readable program code means to configure a computer. The program code means will configure and direct a client computer to store the client profile, establish the plurality of logical connections representing users, generate and communicate the tasks for each of the simulated users, monitor and record response times for the executed tasks, and compute the necessary statistics to assess performance.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for assessing server application software performance under a simulated load generated by at least one client computer connected to at least one server running the server application software via a communications network without having to create actual clients of the server application software in an actual configuration while retaining actual user behavior characteristics, the method comprising the steps of:

defining at least one client profile based on one or more user parameters representing actual user behavior characteristics;

establishing a plurality of logical connections between the at least one client computer and the server application software, said logical connections simulating a plurality of logically simulated clients of the server application software and each client computer having many logical connections with the server application software;

generating periodically, for said logically simulated clients, one or more tasks for transmission to the server application software, the nature, timing and frequency of such tasks for said logically simulated clients being controlled by the client profile; and communicating the tasks to the server application software from the at least one client computer so as to simulate the real time generation and transmission of messages from multiple actual clients of the server application software and without having to create actual clients of the server application software in an actual configuration.

2. A method for assessing server application software performance as recited in claim 1 further comprising the step of monitoring at the client computer responses received from the server application software to the tasks and response times therefor.

3. A method for assessing server application software performance as recited in claim 2 further comprising the step of computing the weighted average response time for all responses received from the server application software.

4. A method for assessing server application software performance as recited in claim 3 further comprising the step of determining the maximum number of clients the server application software can process at a desired weighted average response time.

5. A method for assessing server application software performance as recited in claim 1 further comprising the step of determining the maximum number of clients the server application software can process based on a predetermined criteria.

6. A method for assessing server application software performance as recited in claim 1 wherein the step of defining the client profile comprises defining a separate client profile for each logically simulated client.

7. A method for assessing server application software performance as recited in claim 1 wherein the step of establishing a plurality of logical connections comprises running a multitasking operating system on the at least one client computer such that said logical connections are established by a plurality of processes of said operating system.

8. A method for assessing server application software performance as recited in claim 1 wherein the step of establishing a plurality of logical connections comprises running a multithreaded, multitasking operating system on the client computer such that said logical connections are established by a plurality of threads of a single process of said operating system.

9. A method for assessing server application software performance as recited in claim 1 wherein the step of establishing a plurality of logical connections comprises running a multithreaded, multitasking operating system on the client computer such that said logical connections are established by a plurality of threads under each of a plurality processes of said operating system.

10. A method for assessing server application software performance as recited in claim 1 wherein the step of communicating the tasks to the server application software comprises scheduling each task for said logically simulated clients throughout a time period with an introduced random element to represent the natural variability in user behavior.

11. A method for assessing server application software performance as recited in claim 1 wherein the server application software is an E-mail server and the user parameters used in the client profile correspond to the nature, timing, and frequency of a user operating an E-mail client.

12. A method for assessing server application software performance as recited in claim 11 wherein the tasks comprise sending mail messages and further comprising a means for causing mail message task generation to converge to a steady state by use of a damping factor applied to existing mail messages.

13. A method for assessing E-mail server application software performance under a simulated load generated by at least one client computer connected to at least one server running the server application software via a communications network without having to create actual E-mail clients of the E-mail server application software in an actual configuration while retaining actual E-mail user behavior characteristics, the method comprising the steps of:

defining at least one client profile based on one or more user parameters representing actual E-mail user behavior characteristics;

establishing a plurality of logical connections between the at least one client computer and the E-mail server application software said logical connections simulating a plurality of logically simulated E-mail clients of the E-mail server application software and each client computer having many logical connections with the E-mail server application software, said logical connections comprising individual threads of a process in a multithreaded, multitasking operating system running on the client computer making each of the logical connections with the server;

generating periodically, for said logically simulated E-mail clients, one or more tasks for transmission to the E-mail server application software, the nature, timing and frequency of such tasks for said logically simulated clients being controlled by the client profile and such tasks including E-mail messages;

causing E-mail message task generation to converse to a steady state by use of a damping factor applied to existing E-mail messages to prevent E-mail message task generation from diverging in an unbounded manner, communicating the tasks to the E-mail server application software from the at least one client computer so as to simulate the real time generation and transmission of messages from multiple actual E-mail clients of the E-mail server application software by scheduling each task for said logically simulated E-mail clients throughout a time period with an introduced random element to represent the natural variability in user behavior and without having to create actual E-mail clients of the E-mail server application software in an actual configuration;

monitoring at the at least one client computer responses received from the E-mail server application software to the tasks and response times therefor, computing the weighted average response time for all responses from the E-mail server application software; and determining the maximum number of actual E-mail clients the E-mail server application software can process at a desired weighted average response time.

14. A computer program product for use on at least one client computer connected to at least one server computer via a communications network comprising:

a computer usable medium having computer readable program code means embodied in said medium for assessing the performance of server application software running on a server computer under a simulated load generated by at least one client computer, said computer readable program code means comprising;

program code means for causing the client computer to store at least one client profile based on one or more user parameters representing actual user behavior characteristics;

program code means for causing the client computer to establish a plurality of logical connections between the client computer and the server application software, said logical connections simulating a plurality of logically simulated clients of the server application software and the client computer having many such logical connections;

program code means for causing the client computer to generate periodically, for said logically simulated clients, one or more tasks for transmission to the server application software, the nature, timing and frequency of such tasks for said logically simulated clients being controlled by the client profile; and program code means for causing the client computer to communicate the tasks to the server application software from the client computer so as to simulate the real time generation and transmission of messages from multiple actual clients of the server application software and without having to create actual clients of the server application software in an actual configuration.

15. A computer program product as recited in claim 14 wherein the computer readable program means further comprises program code means for causing the client computer to monitor responses received from the server application software to the tasks and response times therefor.

16. A computer program product as recited in claim 15 wherein the computer readable program means further comprises program code means for causing the client computer to compute the weighted average response time for all responses received from the server application software.

17. A computer program product as recited in claim 16 wherein the computer readable program means further comprises program code means for using the weighted average response time for all responses previously computed to determine the maximum number of clients the server application software can process at a desired weighted average response time.

18. A computer program product as recited in claim 14 wherein the computer readable program means further comprises program code means for causing the client computer to compute the maximum number of clients the server application software can process based on a predetermined criteria.

19. A computer program product as recited in claim 14 wherein the computer readable program means further comprises program code means for storing client profile information for each logically simulated client.

20. A computer program product as recited in claim 14 wherein the client profile based on user parameters corresponds to a user operating an E-mail client.

21. A computer program product as recited in claim 20 wherein the tasks comprise sending mail messages and further comprising program code means for causing mail message task generation to converge to a steady state by use of a damping factor applied to existing mail messages.

22. A computer program product as recited in claim 14 wherein the computer readable program means for establishing the plurality of logical connections to the server application software comprises initiating a plurality of processes under a multitasking operating system, each process to make and control each logical connection.

23. A computer program product as recited in claim 14 wherein the computer readable program means for establishing the plurality of logical connections to the server application software comprises initiating a plurality of process threads under a process of a multithreaded, multitasking operating system, each process thread to make and control each logical connection.

24. A computer program product as recited in claim 14 wherein the computer readable program means for establishing the plurality of logical connections to the server application software comprises initiating a plurality of process threads, said plurality of process threads running under each of a plurality of processes of a multithreaded multitasking operating system, each process thread to make and control each logical connection.

25. A computer program product as recited in claim 14 wherein the computer readable program means for causing the client computer to communicate tasks to the server application software further comprises scheduling the tasks throughout a time period and introducing a random element to the scheduling of tasks to represent the natural variations in user behavior.

26. A computer program product for use on at least one client computer connected to at least one server computer via a communications network comprising:

a computer usable medium having computer readable program code means embodied in said medium for assessing the performance of E-mail server application software running on a server computer under a simulated load generated by at least one client computer, said computer readable program code means comprising;

program code means for causing the client computer to store at least one client profile based on one or more user parameters representing actual E-mail user behavior characteristics;

program code means for causing the client computer to establish a plurality of logical connections between the client computer and the E-mail server application software, said logical connections simulating a plurality of logically simulated E-mail clients of the E-mail server application software and the client computer having many such logical connections, said logical connections comprising program code means for initiating a separate process thread under a process of a multithreaded, multitasking operating system to make and control each logical connection;

program code means for causing the client computer to generate periodically, for said logically simulated E-mail clients, one or more tasks for transmission to the E-mail server application software the nature, timing and frequency of such tasks for said logically simulated E-mail clients being controlled by the client profile and such tasks including E-mail messages;

program code means for causing the client computer to communicate the tasks to the E-mail server application software so as to simulate the real time generation and transmission of messages from multiple actual E-mail clients of the E-mail server application software and without having to create actual E-mail clients of the E-mail server application software in an actual configuration;

program code means for causing E-mail message task generation to converge to a steady state by use of a damping factor applied to existing E-mail messages to prevent E-mail message task generation from diverging in an unbounded manner;

program code means for scheduling the tasks throughout a time period and introducing a random element to the scheduling of tasks to represent the natural variations in E-mail user behavior;

program code means for causing the client computer to monitor responses received from the E-mail server application software to the tasks and response times therefor;

program code means for causing the client computer to compute the weighted average response time for all responses received from the E-mail server application software.

27. A system for assessing server application software performance under a simulated load comprising:

at least one server computer running server application software; and at least one client computer connected to the server computer via a communications network, said client computer comprising:

a CPU;

storage means, electronically coupled and responsive to said CPU, wherein said storage means is partitioned into at least a first memory partition and includes at least one client profile based on one or more user parameters representing actual user behavior characteristics stored in said first memory partition;

interface means, electronically coupled and responsive to said CPU, for establishing a plurality of logical connections between the client computer and the server application software, said logical connections simulating a plurality of logically simulated clients of the server application software and the client computer having many such logical connections;

means, electronically coupled and responsive to said CPU, for generating periodically, for said logically simulated clients, one or more tasks for transmission to the server application software, the nature, timing and frequency of such tasks for said logically simulated clients being controlled by the client profile; and output means, electronically coupled and responsive to said CPU, for communicating the tasks to the server application software so as to simulate the real time generation and transmission of messages from multiple actual clients of the server application software and without having to create actual clients of the server application software in an actual configuration.

28. A system for assessing server application software performance under a simulated load as recited in claim 27 further comprising said storage means divided into a second memory partition and input means, electronically coupled and responsive to said CPU, for receiving responses from the server application software to the tasks and for storing said responses and response times therefor in said second memory partition.

29. A system for assessing server application software performance under a simulated load as recited in claim 28 further comprising said storage means divided into a third memory partition and means, electronically coupled and responsive to said CPU, for computing the weighted average response time for all responses received from the server application software and for storing said weighted average response time in said third memory partition.

30. A system for assessing server application software performance under a simulated load as recited in claim 29 further comprising said storage means divided into a fourth memory partition and means, electronically coupled and responsive to said CPU, for determining the maximum number of clients the server application software can adequately support based on the weighted average response time stored in said third memory partition and for storing said maximum number of clients in said fourth memory partition.

31. A system for assessing server application software performance under a simulated load as recited in claim 27 further comprising said storage means divided into a second memory partition and means, electronically coupled and responsive to said CPU, for determining the maximum number of clients the server application software can adequately support based on a predetermined criteria and for storing said maximum number or clients in said second memory partition.

32. A system for assessing server application software performance under a simulated load as recited in claim 27 further comprising said storage means first memory partition is subdivided into a plurality of memory partitions to store individual client profiles based on one or more user parameters for each logical connection representing a simulated client.

33. A system for assessing server application software performance under a simulated load as recited in claim 27 wherein the user parameters stored in the client profile pertain to the nature, timing, and frequency of a user operating an E-mail client.

34. A system for assessing server application software performance under a simulated load as recited in claim 33 wherein the tasks comprise sending mail messages and further comprising means, electronically coupled and responsive to said CPU, for causing mail message task generation to converge to a steady state by use of a damping factor applied to existing mail messages.

35. A system for assessing server application software performance under a simulated load as recited in claim 27 wherein the interface means establishes said logical connections by initiating a plurality of processes on a multitasking operating system, each process to make and control each logical connection.

36. A system for assessing sever application software performance under a simulated load as recited in claim 27 wherein the interface means establishes said logical connections by initiating a plurality of process threads on a multitasking, multithreaded operating system, each process thread to make and control each logical connection.

37. A system for assessing server application software performance under a simulated load as recited in claim 27 wherein the interface means establishes said logical connections by initiating a plurality of process threads, said plurality of process threads running under each of a plurality of processes on a multitasking, multithreaded operating system, each process thread to make and control each logical connection.

38. A system for assessing server application software performance under a simulated load as recited in claim 27 wherein the output means further comprises means for scheduling the tasks for execution throughout a given time period and for introducing a random element to simulate natural user variability.

39. A system for assessing server application software performance under a simulated load comprising:
- at least one server computer running server application software; and
- at least one client computer connected to the server computer via a communications network, said client computer comprising;
  - a CPU;
  - storage means, electronically coupled and responsive to said CPU, wherein said storage means is partitioned into at least first, second and third memory partitions and includes at least one client profile based on one or more user parameters representing actual user behavior characteristics stored in said first memory partition;
  - interface means, electronically coupled and responsive to said CPU, for establishing a plurality of logical connections between the client computer and the server application software, said logical connections simulating a plurality of logically simulated clients of the server application software and the client computer having many such logical connections, wherein each logical connection is initiated by a separate process thread on a multitasking, multithreaded operating system to make and control the logical connection;
  - means, electronically coupled and responsive to said CPU, for generating periodically, for said logically simulated clients, one or more tasks for transmission to the server application software, the nature, timing and frequency of such tasks for said logically simulated clients being controlled by the client profile and such tasks including E-mail messages, for scheduling the execution of said tasks throughout a given time period, and for introducing a random element to said execution to simulate natural E-mail user variability;
  - output means, electronically coupled and responsive to said CPU, for communicating the tasks to the E-mail server application software so as to simulate the real time generation and transmission of messages from multiple actual E-mail clients of the E-mail server application software and without having to create actual E-mail clients of the E-mail server application software in an actual configuration,
  - means, electronically coupled and responsive to said CPU, for causing E-mail message task generation to converge to a steady state by use of a damping factor applied to existing E-mail messages to prevent E-mail message task generation from diverging in an unbounded manner;
  - input means, electronically coupled and responsive to said CPU, for receiving responses from the E-mail server application software to the tasks and for storing said responses and response times therefor in said second memory partition; and
  - means, electronically coupled and responsive to said CPU, for computing the weighted average response time for all responses received from the E-mail server application software and for storing said weighted average response time in said third memory partition.

* * * * *

UNITED STATES PATENT AND TRADEMARK OFFICE
CERTIFICATE OF CORRECTION

PATENT NO. : 5,812,780

DATED : Sep. 22, 1998

INVENTOR(S) : John Yun-Kuang Chen et al.

It is certified that error appears in the above-identified patent and that said Letters Patent are hereby corrected as shown below:

Col. 4, line 12, after "or" change "maybe" to --may be--

Col. 6, line 14, before "that" change "configurations" to --configuration--

Col. 12, line 34, after "message" change "intp" to --into--

Col. 14, line 58, after "may" insert --be--

Col. 18, line 46, after "software" insert a comma

Col. 21, line 8, after "software" insert a comma

Col. 23, line 17, after "random" change "clement" to --element--

Signed and Sealed this

Eleventh Day of April, 2000

Attest:

Attesting Officer

Q. TODD DICKINSON

Director of Patents and Trademarks